US008920108B2

(12) United States Patent
Naumann et al.

(10) Patent No.: US 8,920,108 B2
(45) Date of Patent: Dec. 30, 2014

(54) MANIPULATOR

(75) Inventors: Bernd Naumann, Erfurt-Schaderode (DE); Markus Wessling-Schäfers, Geseke (DE)

(73) Assignee: Wilfried Strothmann GmbH Maschinenbau und Handhabungstechnik, Schloss Holte-Stukenbrock ( * ) Notice: Subject to any disclaimer, the term of this patent is extended or adjusted under 35 U.S.C. 154(b) by 217 days.

(21) Appl. No.: 13/516,773

(22) PCT Filed: Dec. 21, 2009

(86) PCT No.: PCT/EP2009/067682
§ 371 (c)(1),
(2), (4) Date: Jul. 25, 2012

(87) PCT Pub. No.: WO2011/076249
PCT Pub. Date: Jun. 30, 2011

(65) Prior Publication Data
US 2012/0282066 A1 Nov. 8, 2012

(51) Int. Cl.
B65G 1/133 (2006.01)
B25J 15/00 (2006.01)
B21D 43/05 (2006.01)
B21D 43/10 (2006.01)
B65G 47/91 (2006.01)
B25J 9/02 (2006.01)

(52) U.S. Cl.
CPC .............. B25J 15/0052 (2013.01); B21D 43/05 (2013.01); B21D 43/105 (2013.01); B25J 15/0061 (2013.01); B65G 47/91 (2013.01); B25J 9/023 (2013.01); Y10S 901/16 (2013.01); Y10S 901/40 (2013.01)
USPC ................ 414/749.1; 414/226.05; 414/751.1; 901/16; 901/40; 901/16

(58) Field of Classification Search
CPC ..... B21D 43/105; B21D 47/902; B21D 43/05; B21D 43/10
USPC ............ 414/226.05, 591, 749.1, 751.1, 752.1
See application file for complete search history.

(56) References Cited

U.S. PATENT DOCUMENTS

| 4,132,318 | A | * | 1/1979 | Wang et al. ................... 414/591 |
| 4,907,937 | A | * | 3/1990 | Milenkovic ................... 414/735 |
| 5,274,213 | A | | 12/1993 | Sartorio |
| 5,622,068 | A | * | 4/1997 | Sjoberg .......................... 72/14.8 |
| 2007/0140823 | A1 | * | 6/2007 | Dorner et al. ................. 414/685 |

FOREIGN PATENT DOCUMENTS

DE 3804572 A1 8/1989
DE 20306257 U1 8/2004
(Continued)

Primary Examiner — Saul Rodriguez
Assistant Examiner — Ronald Jarrett
(74) Attorney, Agent, or Firm — Richard M. Goldberg

(57) ABSTRACT

A manipulator for transporting work pieces, especially between two subsequent molding presses of a press working line, including a moving mechanism allowing three dimensional movements on the path between the molding presses, a supplemental arm attached to the moving mechanism and connected to this moving mechanism via a support member that allows a swiveling movement of the supplemental arm around a vertical axis of the support member as well as a translation movement of the supplemental arm with respect to the support member, and a tool support provided at the outer end of a supplemental arm, the tool support being rotatable around a horizontal first axis and around a second axis perpendicular to the first axis, the tool support including a tool reception that is rotatable around a third axis perpendicular with respect to the second axis.

4 Claims, 6 Drawing Sheets

(56) References Cited

FOREIGN PATENT DOCUMENTS

| | | | |
|---|---|---|---|
| DE | 202007010097 | * | 12/2007 |
| EP | 0012741 | A1 | 6/1980 |
| GB | 781465 | A | 8/1957 |
| GB | 2254172 | A | 9/1992 |

* cited by examiner

MANIPULATOR

BACKGROUND OF THE INVENTION

The present invention refers to a manipulator for transferring work pieces, especially between two subsequent molding presses within a molding press line, comprising a moving mechanism for performing three dimensional movements on the path between the two molding presses.

Manipulators are known in a large variety. Some of these manipulators comprise a pivotable manipulator arm with at least two limbs that are connected pivotable around a horizontal axis. By this pivoting or folding movement, the distance from the outer end of the manipulator arm to its support can be shortened or prolonged. Moreover, the height of the outer end of the manipulator arm can be changed by suitable pivoting movements of the two limbs of the arm around their horizontal pivot axis.

When work pieces between two molding presses are transferred, it must be considered that there is not much space between the molding presses, and the space between the upper press tool and the lower press tool of one press is very shallow. For this reason this is a common problem to transfer relatively large work pieces from one molding press into another. If manipulators of the above kind are used for this purpose, comprising foldable arms, the support basis of the adjacent molding presses as well as the support of the manipulator itself obstruct the movement, because the manipulator arm follows a circular arc path during the pivoting movement with its outer end and approaches the basis of the molding presses.

Moreover, another problem is related to the construction of such manipulators, because their movement during the transfer of the work pieces is relatively time consuming and takes much energy.

Apart from the above mentioned manipulators comprising a pivoting arm, there are also so-called linear robots with a relatively simple construction that perform a relatively simple linear transfer movement between the molding presses. However, the known linear robots only comprise very few degrees of freedom in the movement of the work pieces, and so they are not suited for the use in a molding press line. Pivot arm manipulators as well as linear robots both have the common problem that the tool support at the end of the manipulator arm has a construction height that makes the insertion of work pieces in a relatively shallow space within the molding press very difficult.

SUMMARY OF THE INVENTION

It is therefore an object of the present invention to provide a manipulator of the above kind that allows a movement of the work piece with many degrees of freedom and low expense of time and energy. In particular the transfer of a work piece in the small space between the molding presses and an insertion of an end of manipulator arm in the shallow space between the press tools shall be possible.

According to the present invention, this object is achieved by a manipulator comprising the features of the claims.

According to the present invention, a supplemental arm is attached to the moving mechanism via a support member that allows a pivoting movement of the supplemental arm around the vertical axis of the support member as well as a linear transfer movement of the supplemental arm with respect to the support member. This turning ability in connection with the option to extend the supplemental arm with respect to the original manipulator arm provides a high flexibility. In particular the distance between the tool support and the support basis of the manipulator can be shortened or prolonged by the linear extraction and contraction movement, without folding the manipulator arm or moving it in another way of operation.

At the end of the supplemental arm, a tool support is provided that can be pivoted around a horizontal first axis and around a second axis that stands particular with respect to the first axis. Therefore the tool support can be moved freely in space to provide a relatively free position of the workpiece that is supported by the tool. The tool reception of the tool support is additionally turnable around the third axis that stands perpendicular to the second axis. By this there are additional degrees of freedom for the tool at the tool support.

In particular it is possible to pivot the second axis of the tool support by turning it around the horizontal first axis into a horizontal position and to position the tool reception by turning around the second axis also into the horizontal plane, with the result that all three axis are in the same horizontal plane. In this position the end of the supplemental arm with the tool support and the tool reception has all together a relatively low height and allows an insertion of the workpiece into a relatively shallow press space. This introduction can be performed mainly by a linear extraction of the supplemental arm at its support member.

Because the construction according to the present invention provided advantages with respect to its building height in taking and inserting the workpiece in and out of the moulding press, the workpiece can be turned and pivoted freely in the space between the two molding presses because of the large number of degrees of freedom, additional to a linear movability performed by a supplemental arm towards the manipulator support basis or away from it. The respective movements can be performed with relatively low effort of time and energy.

Preferably the tool support is received within a rotation support for rotating around the second axis, while the rotation support itself is held at the end of the supplemental arm rotatable around the first axis.

The tool reception is provided preferably as a bar-shaped holder, with the bar axis representing a third axis.

According to a preferred embodiment of the present invention, the end of the supplemental arm comprises an articulated joint member that is pivotable around a vertical axis and its end supporting the third axis.

With this articulated joint member, the tool support can also be held pivotable at the end of the supplemental arm in a position for moving into the press space, in which the first, second and third axis lie in a common horizontal plane. This pivoting within the horizontal plane around the axis of the articulated joint member can provide a small angular inclination of the supplemental arm with respect to the introduction direction.

Preferably the articulated joint member is fork-shaped and receives the rotation support from both sides.

According to another preferred embodiment of the present invention, the moving mechanism comprises a horizontal beam at which the support member is supported movably along the length of the beam and movable in a vertical direction.

The beam is provided for bridging a longer path within the space between the adjacent molding presses. Between the ends of the horizontal beam, the support member for the supplemental arm is moved, and it can perform the above described movements for introducing and taking workpieces in its respective end positions.

According to another preferred embodiment, the manipulator comprises a foldable arm with a plurality of limbs, while the supplemental arm is provided at the end of this foldable arm.

By the supplemental arm, the above described disadvantages of a foldable manipulator arm are compensated at least partially, because the provision of the flat supplemental arm decreases the danger of collision of the folded parts of the manipulator arm with the support basis of the molding press.

Preferably one or more motors are provided for performing the rotation around the first axis, the second axis and/or around the third axis.

BRIEF DESCRIPTION OF THE DRAWINGS

In the following a preferred embodiment of the present invention is described with respect to the following accompanying figures.

DETAILED DESCRIPTION

Figure 1:
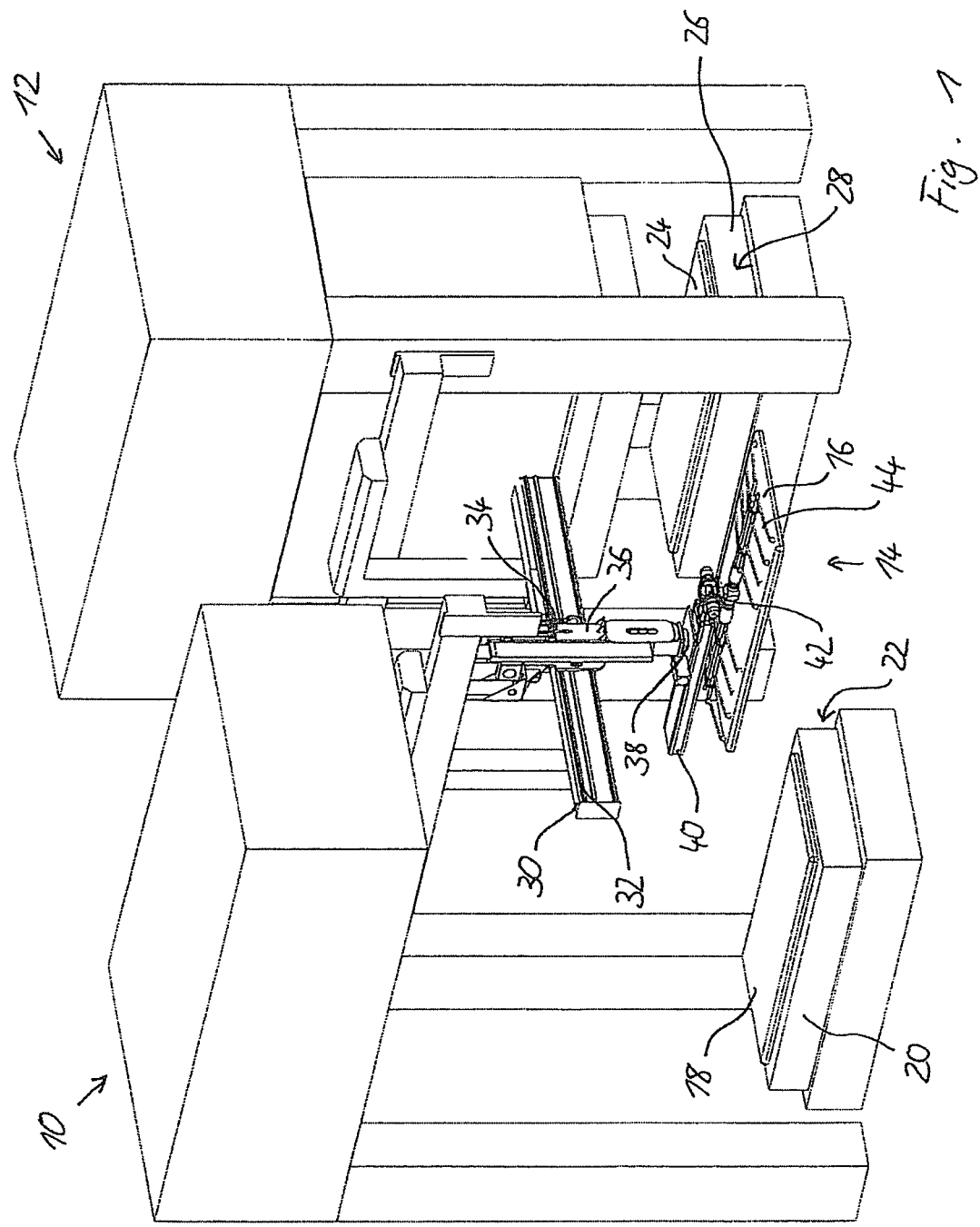
FIG. 1 to 3 show a preferred embodiment of a manipulator according to the present invention within a molding press line.

FIG. 1 shows two subsequent molding presses 10,12 within a molding press line in a schematic manner. Between the molding presses, a manipulator 14 according to the present invention is provided for transferring a workpiece 16 from a first press 10 into the subsequent second press 12. Press 10 comprises a taking position 18 on top of the lower half 20 of a press tool 22, while the second press 12 comprises a reception position 24 on top of the lower half 26 of its press tool 28. The manipulator 14 is provided for taking the workpiece 16 after the pressing operation within the first press 10 from the taking position 18 and to transfer it into the reception position 24 of the second press 12.

For this purpose the manipulator 14 comprises a horizontal beam 30 extending within the space between the two presses 10,12. At the beam 30, rails 32 are provided onto which a horizontal carriage 34 is movable between both ends of the beam 30. At the horizontal carriage 34, a vertically movable vertical carriage 36 is provided that comprises a support member 38 at its lower end. This support member 38 supports a supplemental arm 40 that can be shifted with respect to the support member 38 in the longitudinal direction of the supplemental arm 40 and can be pivoted around the vertical axis of the support member 38.

At the end of the supplemental arm 40 a tool support 42 is provided in a way that is described in the following, said tool support 42 being tiltable and turnable around different axes. The tool support 42 supports a tool 44 for transporting the work piece 16. Because of the moving mechanism formed by the horizontal beam 30, the horizontal carriage 34 and the vertical carriage 36, the tool support 42 can practically reach each any desired point within the space between the presses 10,12 between the taking position 18 and the reception position 24.

Figure 2:
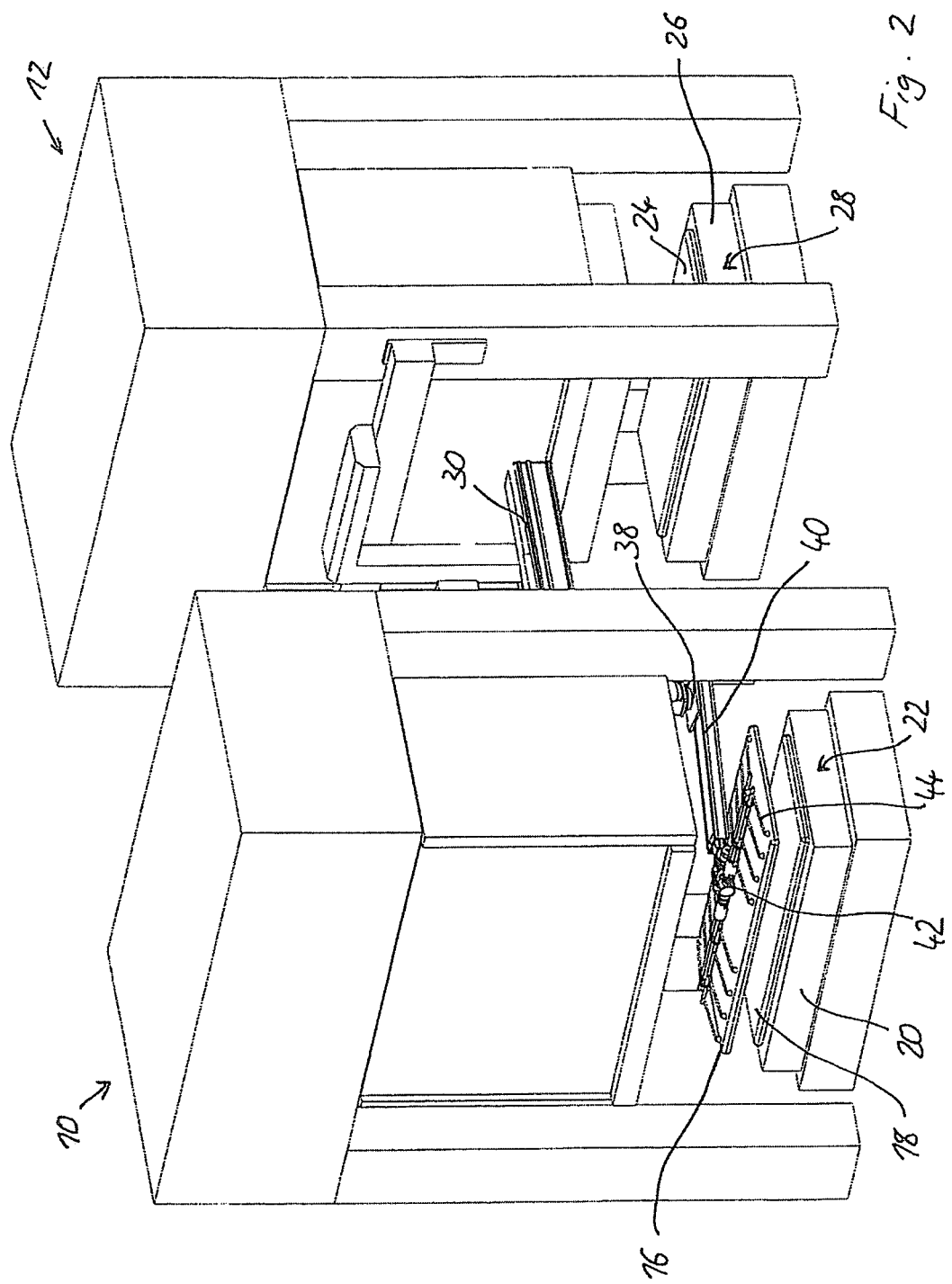
Figure 3:
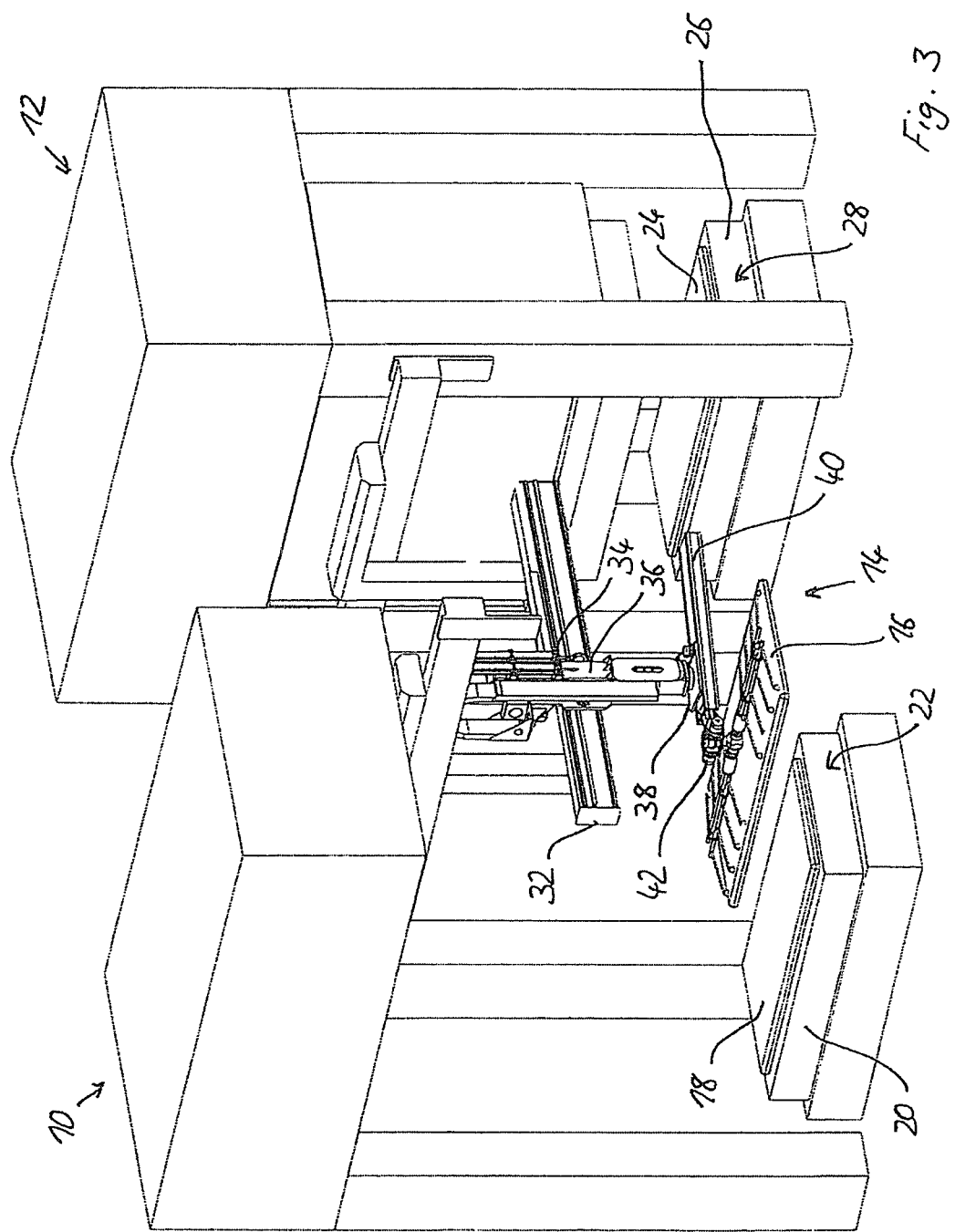

While FIG. 1 shows an intermediate position in which the supplemental arm 40 stands vertically with respect to the beam 30, FIG. 2 shows an extremely extracted position of the supplemental arm 40 in which the workpiece 16 is taken from the first molding press 10, while FIG. 3 shows a position between the position of FIG. 2 and position of FIG. 1, in which the supplemental arm 40 is partially contracted towards the support member 38 but still oriented in the longitudinal direction parallel to the beam 30, before it is pivoted into the position of FIG. 1. In the following movement for inserting the workpiece 16 into the subsequent molding press 12, the supplemental arm 40 is pivoted further in the same turning direction with respect to the support member 38 so that the reception position 24 for the workpiece 16 is reached.

It can be taken from FIG. 2 that the tool support 42 at the end of the supplemental arm 40 within the press room of the first molding press 10 between the two halves of the press tool 22 takes a different position from that shown in FIGS. 1 and 3. This change of position of the tool support is possible due to a construction that will be described in more detail in connection with FIG. 4.

Figure 4:
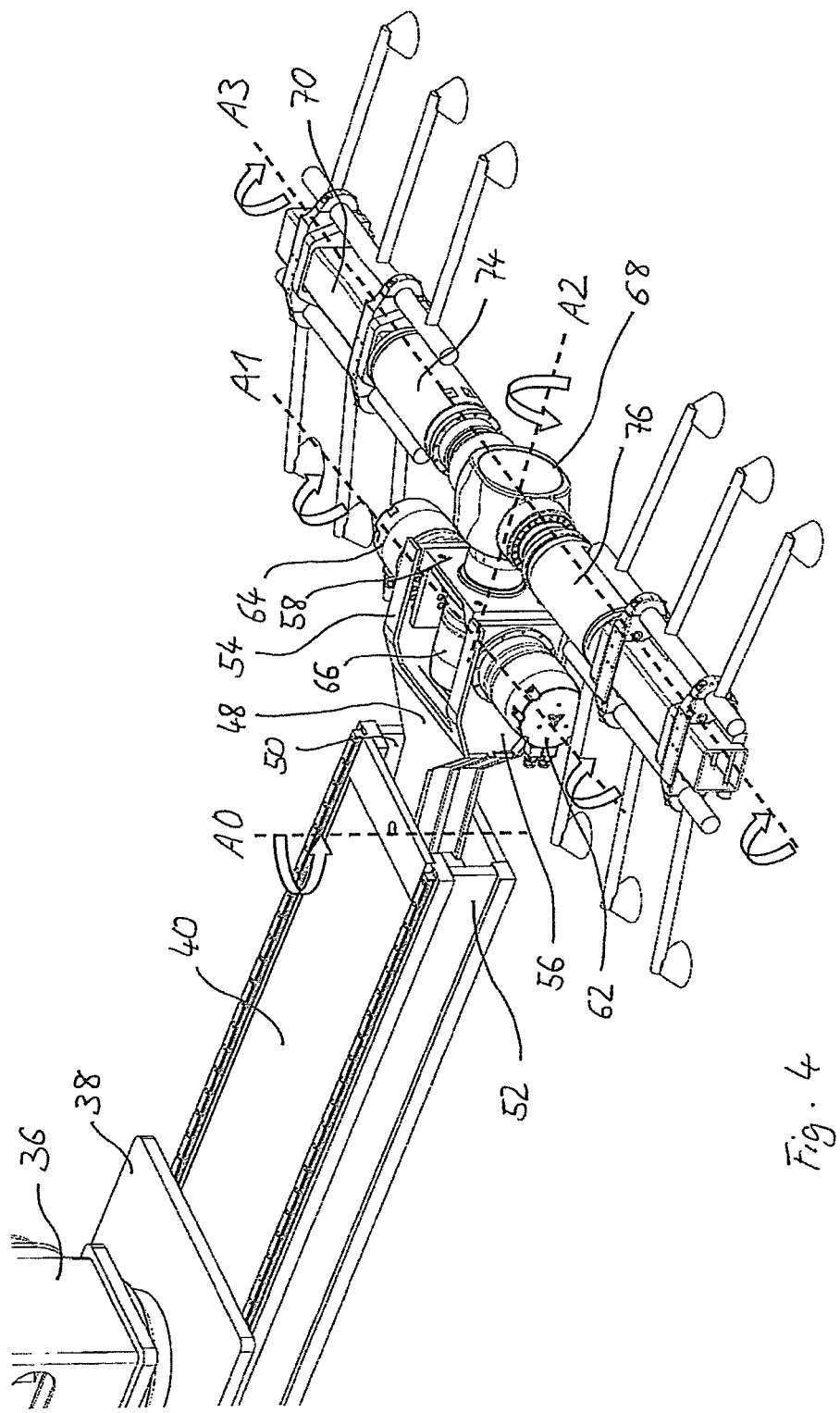
FIG. 4 is a perspective detailed view of the manipulator from the FIG. 1 to 3.

FIG. 4 shows an extracted portion of the supplemental arm 40 that is held at the end of the support member 38. The end 46 of the supplemental arm 40 carries an articulated joint member 48 that is fork-shaped and that is pivotable with respect to the fixed end 46 of the supplemental arm 40 around a vertical axis A0. The pivoting space of the articulated joint member 48 is delimited in a lateral direction by lateral stoppers 50,52 formed by the vertical side walls of the hollow profile that form the supplemental arm 40. For pivoting the articulated joint member 48, a motor drive is provided that is not further explained here.

The fork-shaped articulated joint member 48 comprises two parallel flat bracket arms 54,56. Between these bracket arms 54,56 a rotation support 58 for rotatably supporting the tool support 42 is received. The rotation support 58 itself is held pivotable between the bracket arms 54,56 of the articulated joint member 48 and can be turned around a horizontal axis A1 that stands perpendicular with respect to the rotation axis A2 of the tool support 42. This rotation axis A1 of the rotation support 58 shall be designated as first axis A1 in the following, while the rotation axis A2 of the tool support 42 will be designated as second axis. The turning of the rotation support 58 between the bracket arms 54,56 is performed by means of motor drives 62,64 that are provided at the outer sides of the bracket arms 54,56. For turning the tool support 42 another motor drive 66 is provided on the second axis A2 between the bracket arms 54,56.

The tool support 42 comprises a pin 68 that is received with one of its ends within a rotation support 58. Rod-shaped tool receptions 70,72 extend from the remaining free end of the pin 68, and their rod axis lie on a common third axis A3 that stands perpendicular to the second axis A2. The tool receptions 70,72 are turnable around the third axis A3 at the pin 68. The turning is performed by a corresponding rotation drive 74,76 for turning the respective tool reception 70,72 with respect to the pin 68. Each tool reception 70,72 carries one portion of a tool for lifting the workpiece 16.

While the tool support 42 can be turned around the first axis A1 and around the second axis A2, so that the rod-shaped tool receptions 70,72 can take the desired position in space, the workpiece 16 can be positioned by rotating the tool receptions 70,72 around the third axis A3. This provides a great number of degrees of freedom in the movement of the workpiece 16. Moreover, the tool support 42 can take the flat position shown in FIG. 4, in which all three axes A1, A2 and A3 lie within a common horizontal plane, and the rod-shaped tool receptions 70,72 are positioned by turning around the third axis A3 so that the workpiece itself takes a horizontal position. In this position the workpiece 16 can also be introduced into a space between the two pressing tools of a molding press 10,12 that is relatively shallow.

Figures 5A, 5B:
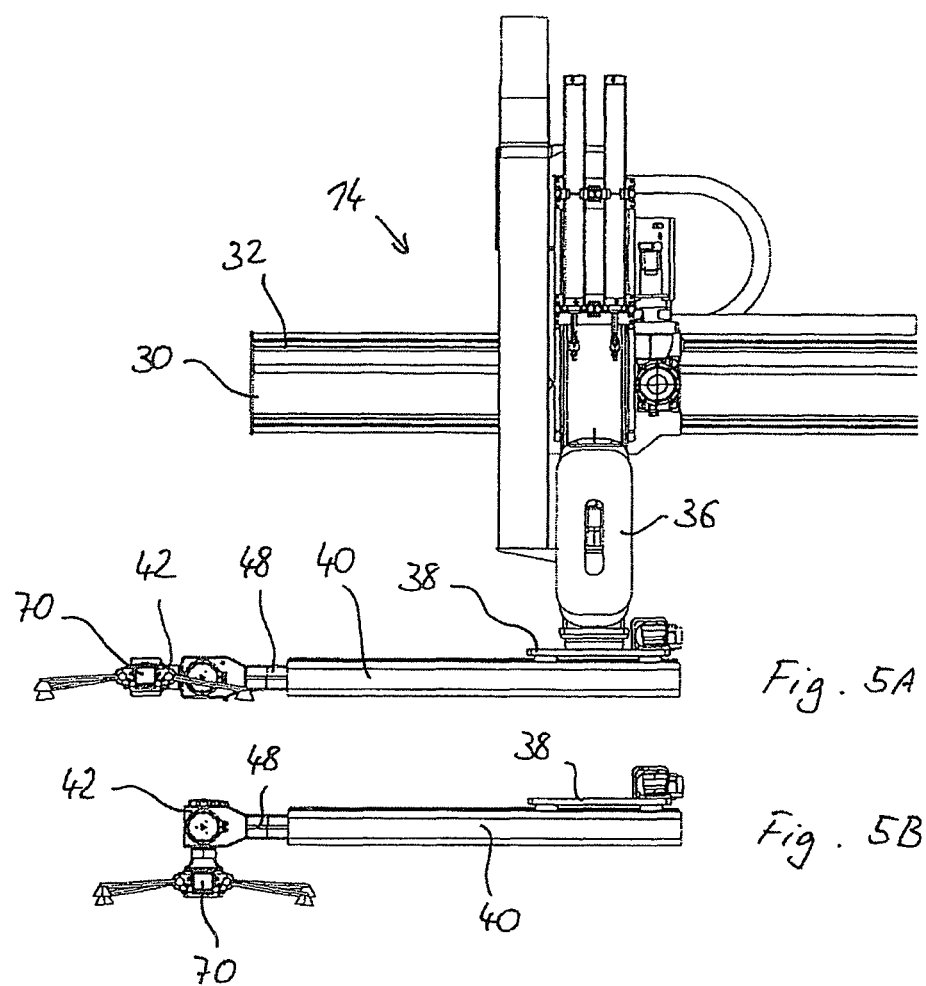
FIGS. 5A and 5B are side views of the shown embodiment of the manipulator according to the present invention into different positions of the tool support.

From this position the tool support 42 can be moved into a position as shown, for example, in FIG. 5B. FIGS. 5A and 5B represent lateral views of the present embodiment of a manipulator according to the present invention into different positions of the tool support 42, namely the position according to FIG. 5A, which has already been described with respect to FIG. 2, and the position according to FIG. 5B, corresponding to FIGS. 1 and 3.

When the tool support 42 is turned around the first axis A1 from the position of FIG. 5A, in which the second axis A2 lies horizontally, with the result that a second axis A2 stands vertical, the position of FIG. 5B is reached. It is clearly shown that in the position of FIG. 5B the tool support 42 has a much greater construction height than in the preceding according to FIG. 5A. Therefore the flat position of FIG. 5A is preferred to introduce a workpiece 16 into a molding press 10,12 or to take it from the press. During the transfer from the position of FIG. 5A into the position of FIG. 5B, the horizontal orientation of the workpiece 16 can be maintained due to the turnability of the rod-shaped tool receptions 70,72 around the third axis A3, compensating the rotation around the first axis A1. The third axis A3 as the rod axis of the tool receptions 70,72 is then pivoted around the horizontal first axis A1, while both axes are held parallel.

Figure 6:
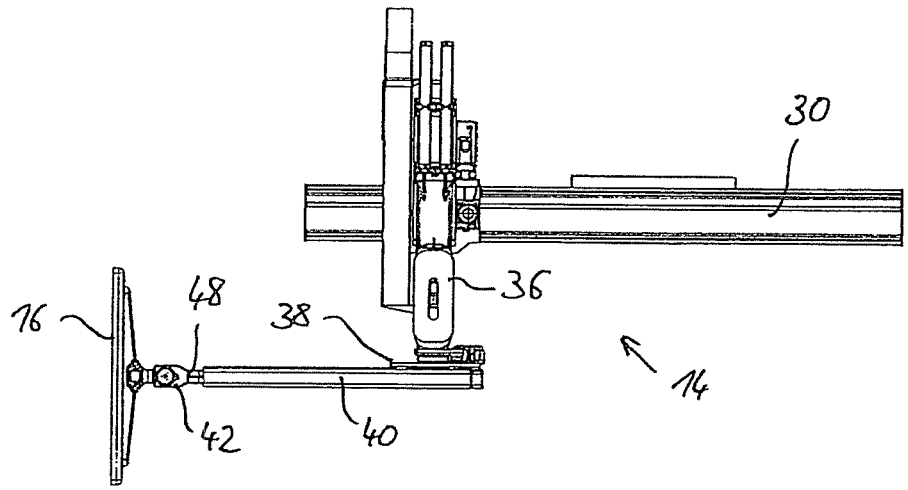
FIGS. 6 and 7 are a side view and one perspective view of the manipulator according to the present invention in another position of the tool support.

The inventive axis construction of the tool support 42 also provides other applications. FIG. 6 shows a situation in which the second axis A2 lies in the horizontal plane and the tool receptions 70,72 are turned around their rod axes, mainly around third axis A3 in a way that the workpiece 16 takes a vertical position. Such a position can be useful in cases in which the workpiece 16 must be taken from a vertical position and must also be deposited in a vertical position. During the transfer from one position into the other, the workpiece 16 can take any desired position, depending on the space between the two molding press stations.

Figure 7:
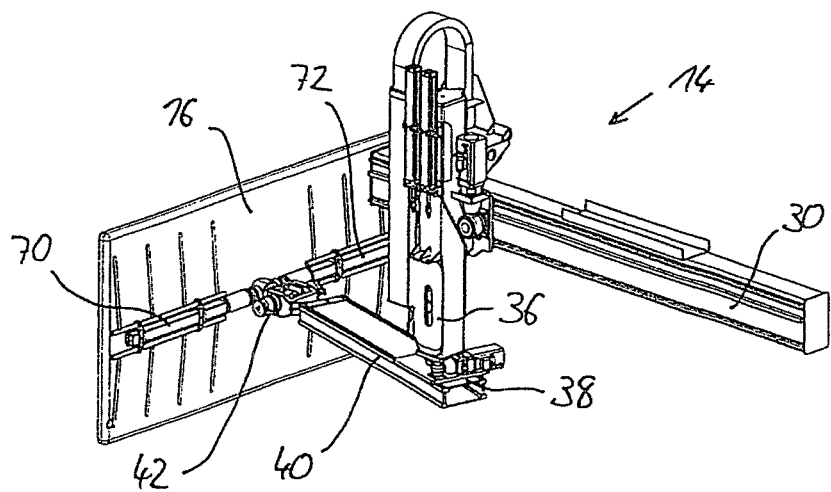

The situation of FIG. 6 is also shown in a perspective manner in FIG. 7. It can be seen that the rod-shaped tool receptions 70,72 are turned with respect to the position of FIG. 4 around 90° around the pin 68 so that the vertical position of the workpiece 16 is reached.

The invention claimed is:

1. Manipulator comprising:
a moving mechanism for transporting work pieces between two subsequent molding presses of a press working line, allowing three dimensional movements on a path between the molding presses,
a supplemental arm attached to the moving mechanism, said supplemental arm connected to said moving mechanism via a support member comprising a vertical axis and allowing a swiveling movement of the supplemental arm around the vertical axis of the support member as well as a translation movement along a linear axis of the supplemental arm with respect to the support member, and
a tool support provided at an outer end of the supplemental arm, said tool support being rotatable around a horizontal first axis relative to the outer end of the supplemental arm and around a second axis relative to the outer end of the supplemental arm and which is perpendicular to the first axis, said tool support comprising a tool reception that is rotatable around a third axis relative to the outer end of the supplemental arm and which is perpendicular with respect to the second axis,
said tool support being received within a rotation support for rotating around the second axis, said rotation support being held pivotable around the first axis at the end of the supplemental arm,
wherein the end of the supplemental arm comprises an articulated joint member provided at the supplemental arm pivotable around a vertical axis, while the third axis is supported at the end of the articulated joint member,
wherein said moving mechanism comprises a horizontal beam at which the support member is held moveable along the length of the beam and moveable in a vertical direction.

2. Manipulator according to claim 1, wherein said articulated joint member is fork-shaped and receives the rotation support from both sides.

3. Manipulator according to claim 1, wherein said tool reception is provided as a bar-shaped holder with a bar axis representing a third axis.

4. Manipulator according to claim 1, wherein at least one motor is provided for pivoting around at least one of the first axis, the second axis and around the third axis.

* * * * *